US010311088B1

(12) United States Patent
Fowler

(10) Patent No.: US 10,311,088 B1
(45) Date of Patent: **\*Jun. 4, 2019**

(54) APPARATUS AND METHOD FOR RESOLVING GEOSPATIAL QUERIES

(71) Applicant: MarkLogic Corporation, San Carlos, CA (US)

(72) Inventor: Jacob Richard Fowler, San Francisco, CA (US)

(73) Assignee: MarkLogic Corporation, San Carlos, CA (US)

( * ) Notice: Subject to any disclaimer, the term of this patent is extended or adjusted under 35 U.S.C. 154(b) by 199 days.

This patent is subject to a terminal disclaimer.

(21) Appl. No.: 15/424,701

(22) Filed: Feb. 3, 2017

(51) Int. Cl.
*G06F 16/20* (2019.01)
*G06F 16/29* (2019.01)
*G06F 16/2458* (2019.01)

(52) U.S. Cl.
CPC .......... *G06F 16/29* (2019.01); *G06F 16/2462* (2019.01)

(58) Field of Classification Search
CPC ......... G06F 17/30241; G06F 17/30536; G06F 16/29; G06F 16/2462
See application file for complete search history.

(56) References Cited

U.S. PATENT DOCUMENTS

| 7,426,455 | B1* | 9/2008 | Antony | ................. G06F 17/10 345/443 |
| 8,983,953 | B2 | 3/2015 | Oikarinen et al. | |
| 9,426,620 | B2 | 8/2016 | Xu et al. | |
| 9,769,365 | B1* | 9/2017 | Jannard | .............. H04N 5/23238 |
| 2004/0225665 | A1* | 11/2004 | Toyama | ............ G06F 17/30241 |
| 2014/0362174 | A1* | 12/2014 | Fan | ......................... G06T 17/05 348/36 |
| 2015/0261786 | A1 | 9/2015 | Xu et al. | |
| 2016/0117346 | A1* | 4/2016 | Han | ................ G06F 17/30241 707/724 |
| 2016/0119748 | A1* | 4/2016 | Li | ......................... H04L 67/26 455/456.3 |
| 2017/0011089 | A1* | 1/2017 | Bermudez Rodriguez | ................. G06F 17/30445 |
| 2017/0039222 | A1* | 2/2017 | Farrow | ............ G06F 17/30241 |
| 2017/0277717 | A1* | 9/2017 | Asaad | ....................... G06F 7/02 |
| 2018/0225802 | A1* | 8/2018 | Vij | .................... G06F 17/30339 |

* cited by examiner

*Primary Examiner* — Kris E Mackes
*Assistant Examiner* — Tiffany Thuy Bui
(74) *Attorney, Agent, or Firm* — Cooley LLP

(57) ABSTRACT

A method implemented by a computer with a processor and a memory storing instructions executed by the processor includes receiving a query with a search region and a predicate. The search region is mapped to a set of blocks. For each block in the set of blocks, ellipsoidal geographic coordinates of the search region are transformed to flat coordinates. Results are retrieved from a primary index when the block does not contain a boundary of the search region. Results are retrieved from a secondary index when the block does contain a boundary of the search region. Retrieving results from the secondary index includes processing the boundary and the predicate against the secondary index.

4 Claims, 6 Drawing Sheets

US 10,311,088 B1

APPARATUS AND METHOD FOR RESOLVING GEOSPATIAL QUERIES

CROSS REFERENCE TO RELATED APPLICATION

This application is related to the commonly owned and concurrently filed U.S. Ser. No. 15/424,686, filed on Feb. 3, 2017.

FIELD OF THE INVENTION

This invention relates generally to processing of geographic information. More particularly, this invention relates to a grid-based geospatial primary index and secondary index used to resolve geospatial queries.

BACKGROUND OF THE INVENTION

It would be desirable to provide a computer capability to quickly search for regions on the surface of the earth. Examples of regions are polygons, circles, and boxes. Regions may be associated with documents stored in a database. Therefore, it would be desirable to provide a user with the ability to query the database using a query region and a spatial predicate, such as defined in the Dimensionally Extended Nine-Intersection Model (DE-9IM). The spatial predicate is a space relation between the query region and regions in the database, such as equals, disjoint, touches, contains, intersects, inside and covered by.

An example query is to "find all regions that overlap with a circle of radius 100 km centered on San Francisco." The database should then provide all documents that contain matching regions.

Existing region indexes are usually based on one of two techniques: R-trees and quadtrees/geohashes. In the R-tree approach, the minimum bounding rectangles (MBRs) of the stored regions are indexed using an R-tree data structure. At query time, the index is searched using the MBR of the query region. If the MBRs interact appropriately, the stored region is considered to be a match.

In the quadtree/geohash approach, the earth is divided into a grid, with the grid squares organized hierarchically into a tree. A leaf node in this tree tracks which stored regions intersect with the grid square. At query time, a node in the tree is only searched if the query region interacts with that grid square.

Either approach can yield false positives, so it is typical to see it combined with a secondary index or filter step that retrieves the region from storage and checks it against the query region. For regions such as polygons, this is done using computational geometry techniques. This geometry is the most expensive part of the query. The primary purpose of the index is to reduce the number of geometry calculations that must be performed.

Existing indexes generally operate independently of a coordinate system. That is, regions on a geographic coordinate system (i.e., on the earth) are indexed in the same way for a Euclidean coordinate system (i.e., a flat plane) using MBRs or a grid system. For a geographic coordinate system, the geometry calculations of the secondary filter must be performed using ellipsoid geometry, which are more expensive than the calculations for Euclidean geometry.

Accordingly, it would be desirable to provide a system that reduces the query time expense of ellipsoidal geometric calculations associated with a geospatial search.

SUMMARY OF THE INVENTION

A method implemented by a computer with a processor and a memory storing instructions executed by the processor includes receiving a query with a search region and a predicate. The search region is mapped to a set of blocks. For each block in the set of blocks, ellipsoidal geographic coordinates of the search region are transformed to flat coordinates. Results are retrieved from a primary index when the block does not contain a boundary of the search region. Results are retrieved from a secondary index when the block does contain a boundary of the search region. Retrieving results from the secondary index includes processing the boundary and the predicate against the secondary index.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
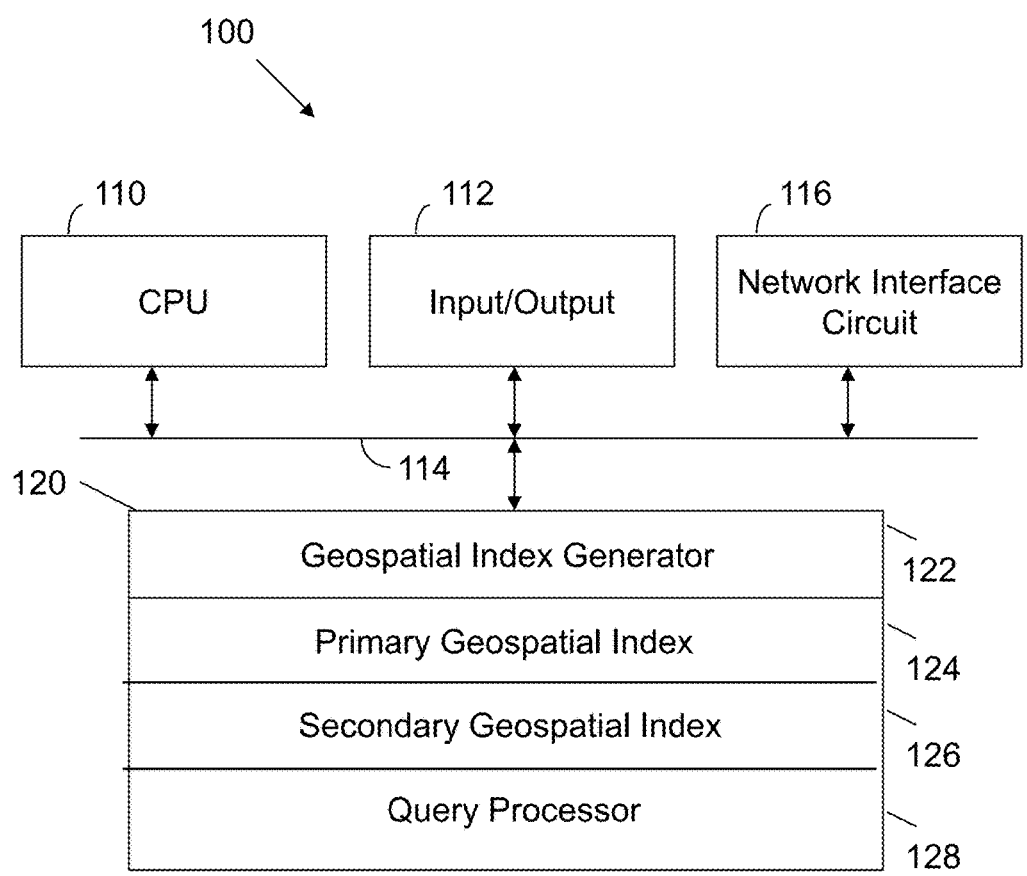
FIG. 1 illustrates a machine configured in accordance with an embodiment of the invention.

FIG. 1 illustrates a machine 100 configured in accordance with an embodiment of the invention. The machine 100 includes a central processing unit 110 connected to input/output devices 112 via a bus 114. The input/output devices 112 may include a keyboard, mouse, touch display and the like. A network interface circuit 116 is also connected to the bus 114 to provide connectivity to a network (not shown). Thus, the machine 100 may operate in a networked environment. For example, the machine 100 may be a server that responds to queries from client devices communicating through the network interface circuit 116.

A memory 120 is also connected to the bus 114. The memory 120 stores instructions executed by the central processing unit 110 to implement operations disclosed herein. In particular, the memory 120 stores a geospatial index generator to produce a primary geospatial index 124 and a secondary geospatial index 126. The memory 120 also stores a query processor 128 that resolves geospatial queries using the primary geospatial index 124 and the secondary geospatial index 126.

The primary index 124 and secondary index 126 are based on a grid system. The earth is divided into grid blocks, and each grid block has an associated coordinate system projection. The projection translates geographic coordinates for points within the block to local Euclidean coordinates. Together, the primary and secondary index store the information necessary to search the regions stored in the system.

The primary index 124 stores information about grid blocks that are entirely contained in the interior or exterior of a stored region. Given a grid block, the primary index may be queried to retrieve a list of all stored regions that entirely contain the block, or that are entirely disjoint from the block. The primary index could be implemented using, e.g., a quadtree, prefix tree (trie), or a prefix-string index.

The secondary index 126 stores information about grid blocks that partially overlap a stored region; that is, any grid block that contains a boundary segment of the region. The secondary index stores these boundary segments in the local coordinates of the grid block and indexes the minimum bounding rectangles (MBRs) of the boundary segments. The secondary index may be queried with a given grid block, an MBR in that block, and a spatial predicate. The result of the query is a list of regions that possibly match the spatial predicate, based on the MBR of the boundary segment. Additionally, the boundary segment for a specific region and block may be retrieved from the secondary index, so that a possible match can be evaluated. The secondary index could be implemented using, e.g., R-trees. The secondary index may share or partially share an implementation with the primary index.

This approach has the benefit of moving most of the expensive ellipsoid calculations to the time that a document is inserted into a database. The boundary segments of the stored regions are stored in local coordinates, so at query time only the query region must be projected to local coordinates. One complexity of this approach is that a region may overlap with more than one grid block. In this case the region must be sliced into pieces (one for each grid block), and each piece will result in a separate entry in the primary or secondary index.

Figure 2:
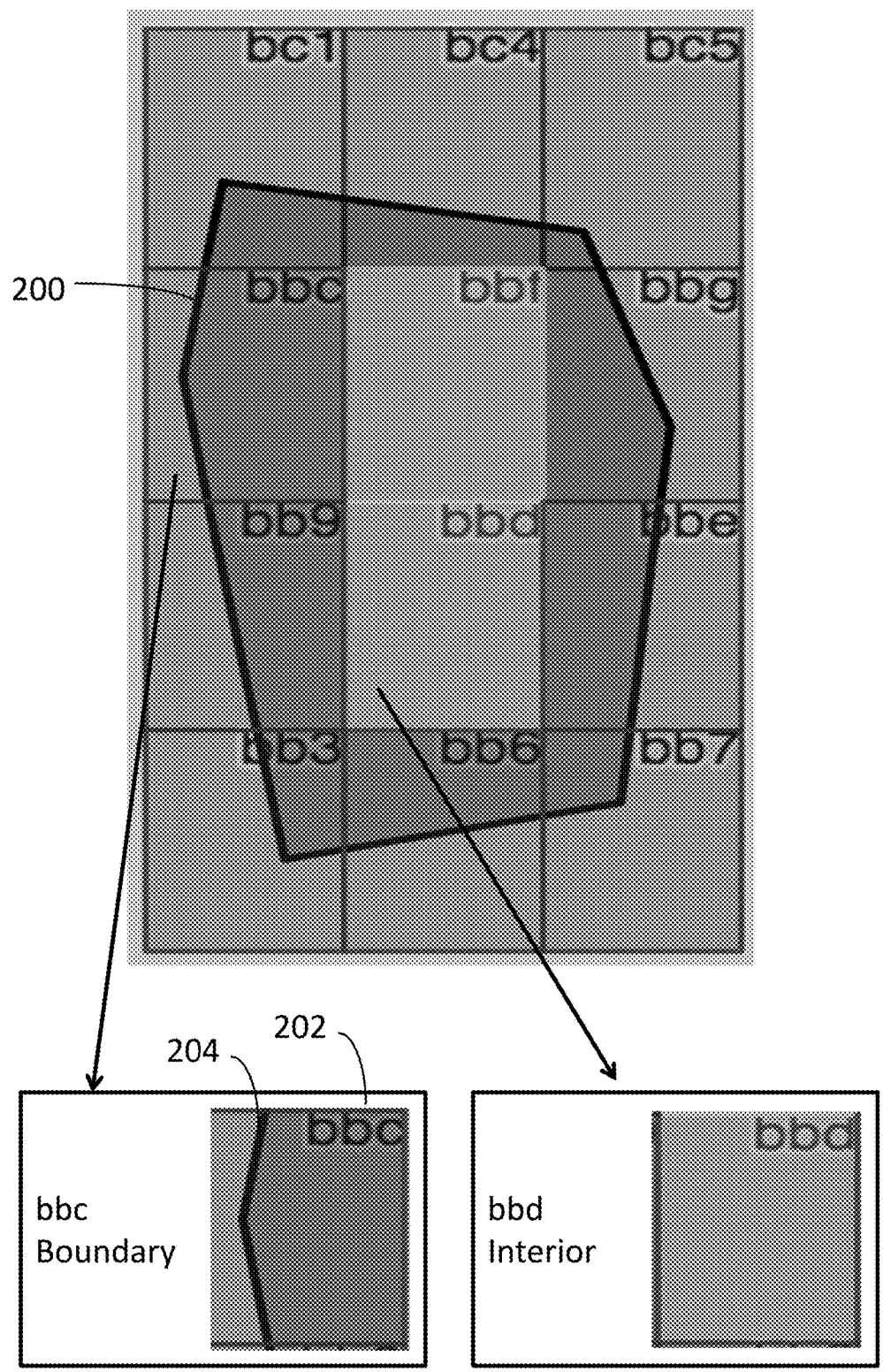
FIG. 2 illustrates a geospatial region processed in accordance with an embodiment of the invention.

Consider a geospatial region 200 in FIG. 2. The geospatial region 200 is mapped to a set of blocks marked as bc1, bc4, bc5, bbc, bbf, bbg, bb9, bbd, bbe, bb3, bb6, and bb1. Blocks bbf and bbd are interior to the geospatial region 200 and therefore are placed in the primary index 124. The remaining blocks contain a boundary of the geospatial region 200. In other words, for each of the remaining blocks a segment of the geospatial region resides within a block and that segment has a boundary that circumscribes a region within the block. In FIG. 2, segment 202 in block bbc includes a boundary 204.

Figure 3:
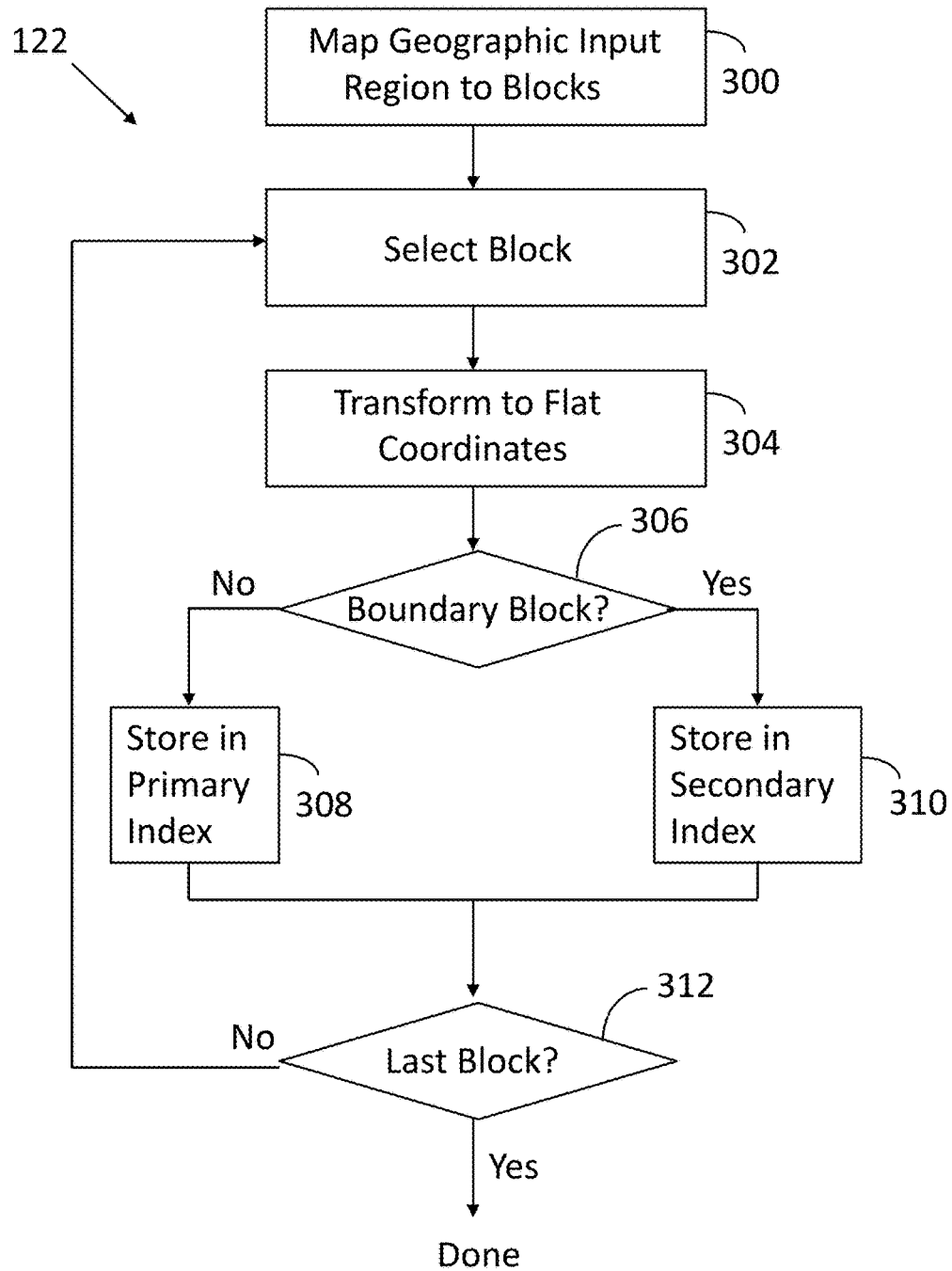
FIG. 3 illustrates geospatial index generation operations performed in accordance with an embodiment of the invention.

FIG. 3 illustrates processing operations associated with the geospatial index generator 122. A geographic input region is mapped to blocks 300. For example, FIG. 2 illustrates geographic region 200 being mapped to 12 blocks. A block is selected for processing 302. The block is transformed to flat coordinates 304. That is, ellipsoidal geographic coordinates of the geographic input region are transformed into flat coordinates. It is then determined whether the block contains a boundary 306. If the block does not contain a boundary (306—No), the block is stored in the primary index 124. In the example of FIG. 2, blocks bbf and bbd would be placed in the primary index 124. If the block contains a boundary (306—Yes), it is stored in the secondary index 310. In the example of FIG. 2, all blocks except blocks bbf and bbd would be placed in the secondary index 124. It is then determined whether the processed block is the last block 312. If not (312—No), processing returns to operation 302. If so (312—Yes), processing is completed.

Figure 4:
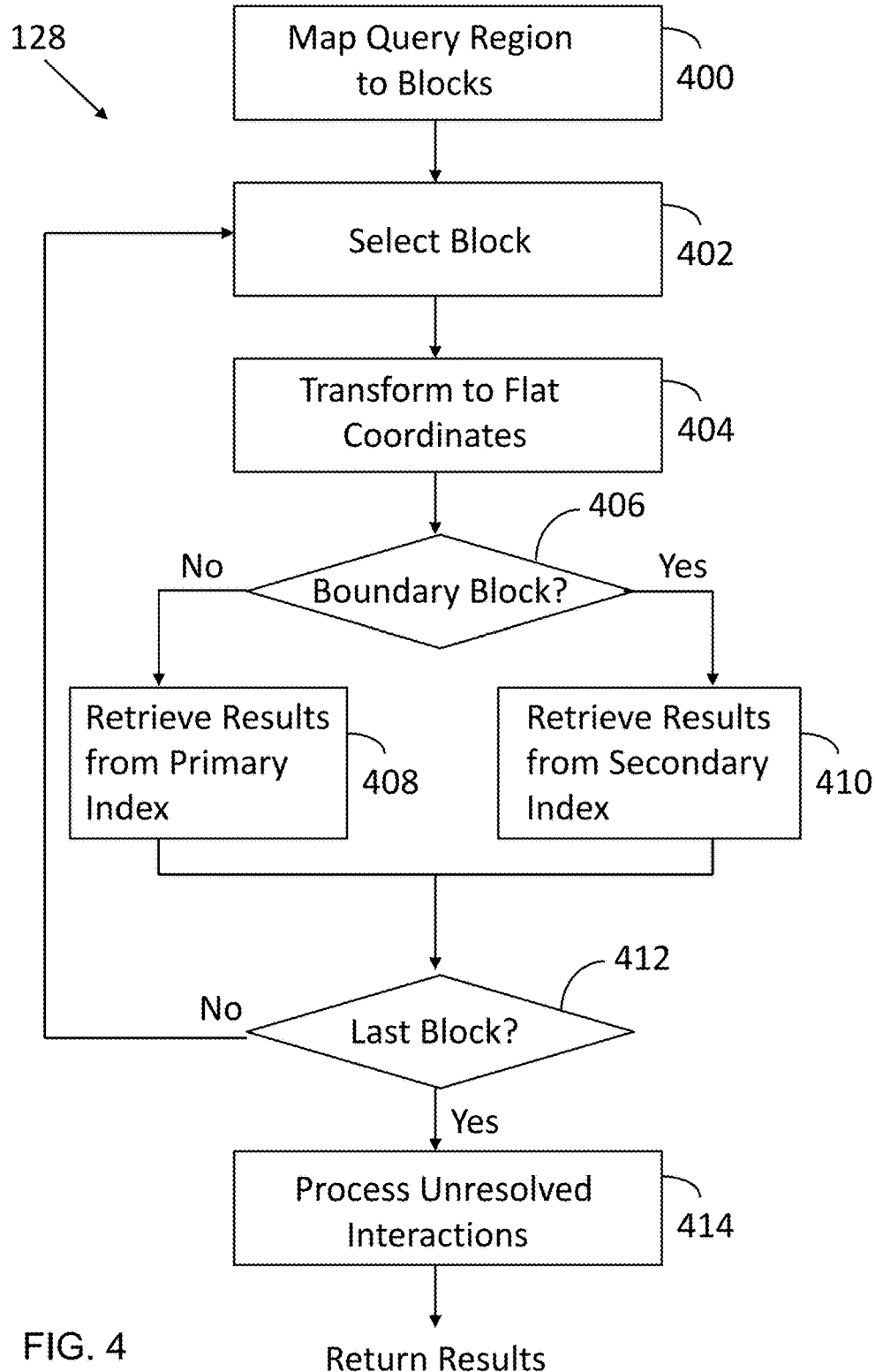
FIG. 4 illustrates query processing operations performed in accordance with an embodiment of the invention.

FIG. 4 illustrates operations performed by query processor 128. A region specified in a query is mapped to blocks 400. Using the previously discussed example, the query "find all regions that overlap with a circle of radius 100 km centered on San Francisco" would be mapped to a set of blocks, such as shown in FIG. 2. An individual block is then selected for processing 402. The ellipsoidal geographic coordinates associated with the block are transformed to flat coordinates 404. It is then determined whether the block contains a boundary 406. If not (406—No), results are retrieved from the primary index 408. In other words, an interior block without a boundary is processed against interior regions indexed within the primary index. The primary index also has exterior regions (i.e., blocks that do not intersect with a specified geographic input region). If the block contains a boundary (306—Yes), results are retrieved from the secondary index 410. It is then determined whether the processed block is the last block 412. If not (412—No), processing returns to operation 402. If so (412—Yes), any remaining unresolved states are resolved 414 and the results are returned to the user.

Figure 5:
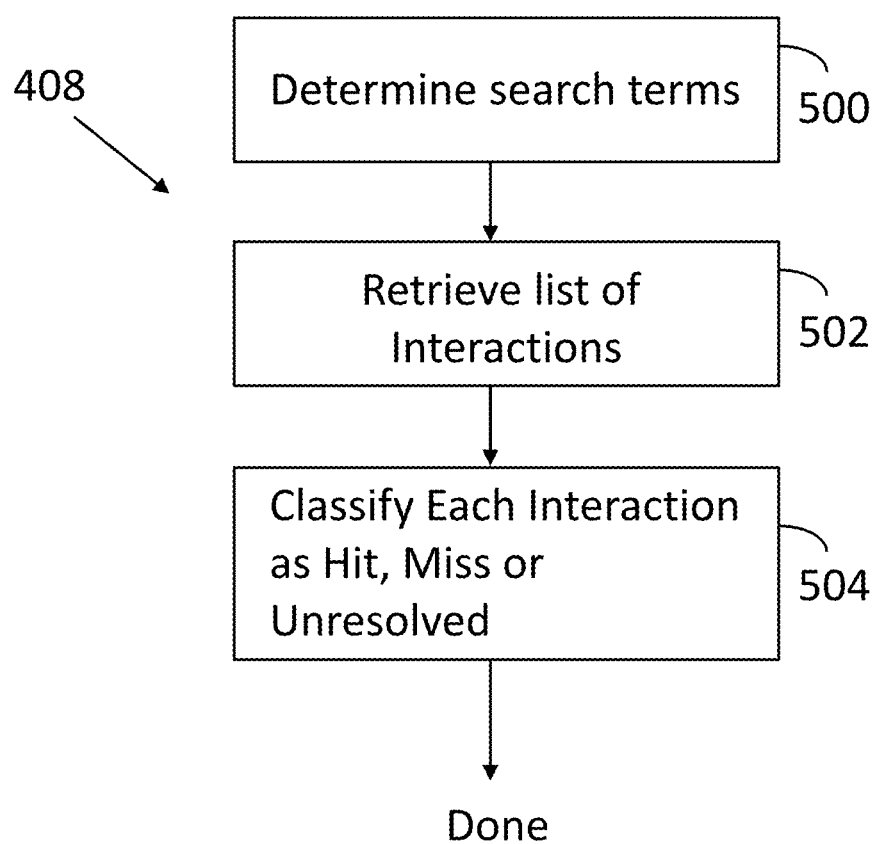
FIG. 5 illustrates primary index processing performed in accordance with an embodiment of the invention.

FIG. 5 illustrates the process of retrieving results from the primary index 408. First, a list of interaction terms is calculated 500, based on the spatial predicate. For example, consider the case of the Dimensionally Extended Nine-Intersection Model (DE-9IM). The spatial predicate is a space relation between the query region and regions in the database, such as equals, disjoint, touches, contains, intersects, inside and covered by. For the predicate 'intersects', one search term would be for an interior/interior (II) interaction; for the predicate 'within', there would be a search term for an interior/interior (II) interaction and a negative search term for an interior/exterior (IE) interaction. The primary index is searched for any matching interactions 502, and each result is classified as a hit, a miss, or unresolved 504. For an example of an unresolved result, consider the DE-9IM predicate 'within'. An interior/exterior (IE) negative match in another block could cancel a positive II match from this block. These cases are resolved after all blocks have been processed (FIG. 4; 414).

Figure 6:
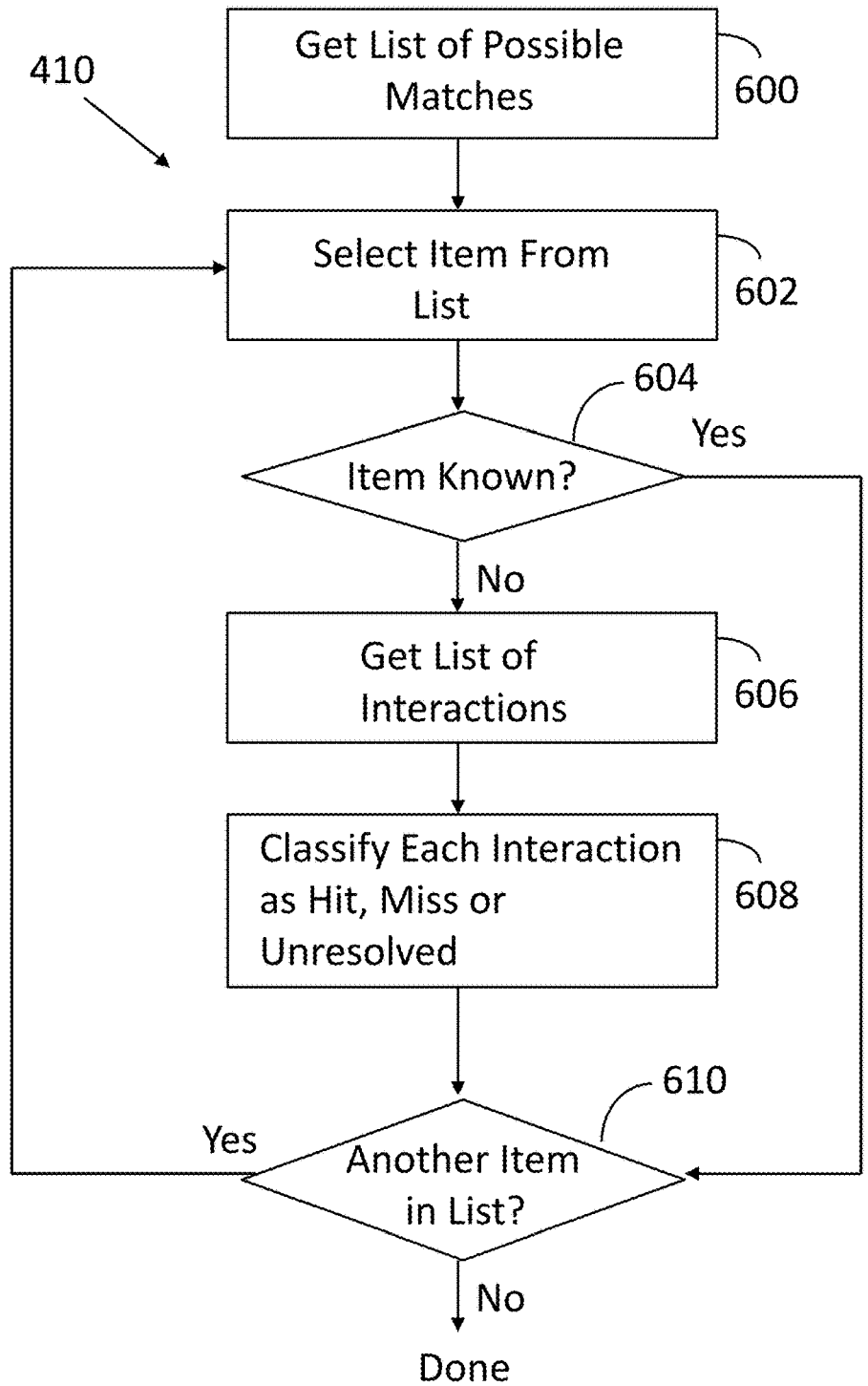
FIG. 6 illustrates secondary index query processing performed in accordance with an embodiment of the invention.

FIG. 6 more particularly characterizes the process of retrieving results from the secondary index 410. At this point a block with a boundary is being processed. The boundary and the predicate associated with the query are used to obtain a list of possible matches 600. The list of possible matches contains a list of regions within the secondary index 126 whose interactions with the search region may match the spatial predicate. An item is selected from the list 602. It is determined whether the item is known 604 to be a hit or miss. The item may be known from processing a previous block. If so (604—Yes), processing proceeds to operation 610. If not (604—No), a list of interactions is calculated 606. In the case of DE-9IM, the interactions are between the interior, boundary and exterior of the search region specified in the query and a region in a block of the secondary index. Each interaction may relate to one or more of the spatial predicates equals, disjoint, touches, contains, intersects, inside and covered by. Each interaction is compared with the spatial predicate and the result is classified as a hit, miss or unresolved 608. It is then determined whether another item is in the list 610. If so (610—Yes), control returns to block 602. If not (610—No), processing is completed for the individual block.

The invention is more fully appreciated in connection with the following example implementation. The implementation is based on a grid system using geohashes, and the primary index is implemented with prefix strings. A geohash is a string that represents a box on the surface of the earth. For example, the geohash "9q8zn9" represents the set of points with latitude between 37.798462° N and 37.803955° N, and longitude between 122.40967° W and 122.39868° W.

A longer geohash represents a smaller box. So, "9q8zn9r0cq8z" represents a small box contained inside the box for "9q8zn9".

A geohash index typically works as follows. A geohashing algorithm takes a region and produces a set of geohashes that represent boxes that completely cover the region. The resulting geohashes are stored either in a quadtree (or similar data structure) or are indexed as strings. To query the index, the query region is geohashed, and quadtree or string index can be searched to find geohashes that coincide, are prefixes of, or have as a prefix the query hashes (depending on the predicate).

One limitation of geohash indexes is that it is not possible to completely resolve the query from the index alone. It is possible for the index to produce false positives. For example, two regions that do not overlap may nonetheless both geohash to the string "9q8zn9." So a query with predicate "overlaps" may match these two regions, even though they do not overlap. The secondary index 126 is used to obtain exact matches.

Consider a case where a document is ingested and the user has configured a geospatial region index on an XPath expression. The index generator 122 will detect the presence of any matching nodes in the document and store the regions contained in them in the geohash index. Note that unlike most geohash indexes, the current invention utilizes a secondary index 126 for boundary geohashes (whose boxes contain points on the boundary of the region) and a primary index 124 for interior geohashes (with boxes contained entirely in the interior of the region). The primary index 124 also has exterior geohashes (with box disjoint from the region). Storing this additional information allows one to narrow search results for the various DE-9IM predicates; these predicates are defined in terms of the intersections of the boundary, interior, and exterior of the regions.

All the interior, boundary, and exterior geohashes are stored as terms in a universal index that includes the primary index 124 and the secondary index 126, together with a prefix term for each possible prefix of the geohash. For example, suppose a document contains a geographic region R that is to be inserted into the index. First, the geohashes of R are calculated 300. Suppose R has a boundary geohash "9q8zn9" and an interior geohash "bq". That is, the box of "bq" is entirely contained in the interior of R, whereas the box of "9q8zn9" intersects with the boundary of R. First, consider the geohash string "bq" (302). This is an interior block (306) and would result in the following terms being stored in the universal index (308).

Interior-geohash(bq)
Interior-geohash-prefix(bq)
Interior-geohash-prefix(b)

Because the geohash string "9q8zn9" contains a boundary segment of R (306), this hash string is indexed in the secondary index. This results in the following terms in the universal index.

Boundary-geohash(9q8zn9)
Boundary-geohash-prefix(9q8zn9)
Boundary-geohash-prefix(9q8zn)
Boundary-geohash-prefix(9q8z)
Boundary-geohash-prefix(9q8)
Boundary-geohash-prefix(9q)
Boundary-geohash-prefix(9)

Intersection of the region R with the box represented by "9q8zn9" is calculated. The resulting boundary segment is projected to local coordinates (304) and indexed in the secondary index 310. Once all the geohashes of R have been processed (312), indexing is complete.

To query the index, the user provides a search region and a predicate. The search region is geohashed to calculate its interior, exterior, and boundary geohashes 400. Then based on the predicate, a set of search terms is determined by examining each geohash block 402. The search terms may include interior, exterior, and boundary geohash or geohash-prefix terms. Each search term represents an interaction between a geohash of the search region and a geohash of a stored region. The list of search terms consists of those interactions that are relevant to the given spatial predicate. The universal index is then queried to find all documents that match these terms 408. If any results match a boundary geohash term (406—Yes), then the secondary index 410 must be used to completely resolved the query.

The determination of query terms 500 is based on the definition of the DE-9IM predicates, and the property that a prefix of a geohash represents a larger box containing that geohash box. For example, the DE-9IM predicate "within" is defined as "II & ~IE & ~13E." This means that "A within B" if and only if the interior of A intersects the interior of B; and the interior of A does not intersect the exterior of B; and the boundary of A does not intersect the exterior of B. (The letters I, B, E stand for interior, boundary, and exterior; putting two of them together means intersection.)

If one has knowledge of an interaction between the geohashes of a document region R and the query region Q, one can deduce whether the interior/boundary/exterior of R does, may, or does not intersect the interior/boundary/exterior of Q. For example, a boundary geohash of R contains points from the interior and exterior of R in addition to points on the boundary of R. So, if an interior geohash of Q contains (i.e., is a prefix of) a boundary geohash of R, then one can conclude that the exterior of Q intersects the interior of R, and the boundary of Q intersects the interior of R, and the interior of Q intersects the interior of R—that is, "II & BI & EI". For a given spatial predicate, we determine which interactions are relevant and query the universal index to retrieve the list of documents that interact in the given ways 502.

The overall approach to searching is to first search for terms that indicate a region is a possible match. Then rule out documents with terms that definitely do not match. So for the "within" predicate, obtain all documents with terms that indicate "II" may be true; that is, the interior of the query region could possibly intersect the interior of the document region. Then rule out the documents with terms that indicate "IE" or "BE" is definitely true. By following this logic, each result is classified as a hit (definite match), miss (definite non-match) or unresolved (cannot yet conclude) 504.

The matches for boundary geohash terms must be resolved using the secondary index. First, the secondary index is queried to find any possible matches 600. For each such match 602, one first checks if the region is already known to be a hit or miss from the primary index query or previous secondary index processing (for other blocks) 604. If so (604—Yes), skip the secondary index geometry calculations. Otherwise (604—No) we must retrieve the stored boundary component and calculate all DE-9IM interactions with the query region 606. These interactions are added to the interactions we know about from previous processing, and based on the spatial predicate we classify the match as a hit, miss, or unresolved.

Once all secondary index resolution is complete (610—Yes) for all blocks (412—Yes), there are no more possible interactions to be found. So, each remaining unresolved result is classified as hit or miss based on the interactions we observed during primary and secondary index resolution 414. The resulting hits are returned to the user as the result of the query.

For a concrete example of the query processor 128, suppose the query region Q has a boundary geohash "bqz" and no interior geohashes. The exterior geohashes of Q are the single letter hashes "0", "1", ..., "y", "z" (excluding "b"); the two letter hashes "b0", "b1", ..., "bz" (excluding "bq"); and the three letter hashes "bq0", "bq1", "bqy" (excluding "bqz"). Consider the case where one wants to find all documents that contain a region R within Q.

First determine the positive search terms for the interaction "II". This includes the search terms for any interior geohash box that intersects box "bqz". A boundary geohash box can contain points in the interior or exterior of the region in addition to points on the boundary so the list of search terms also includes any boundary geohash box that intersects box "bqz". Two geohash boxes intersect if one is a prefix of the other so the list of positive search terms consists of any boundary or interior geohash that is a prefix of "bqz" or has "bqz" as a prefix.

Boundary-geohash(bqz)—boundary that's a prefix of "bqz"
Boundary-geohash(bq)—boundary that's a prefix of "bqz"
Boundary-geohash(b)—boundary that's a prefix of "bqz"
Boundary-geohash-prefix("bqz")—boundary that has "bqz" as a prefix
Interior-geohash(bqz)—interior that's a prefix of "bqz"
Interior-geohash(bq)—interior that's a prefix of "bqz"
Interior-geohash(b)—interior that's a prefix of "bqz"
Interior-geohash-prefix(bqz)—interior that has "bqz" as a prefix Next, determine the negative search terms for the interactions "~IE" and "~BE". Since the boundary geohash box "bqz" contains some exterior points, rule out any region that contains "bqz" entirely in its interior (~IE). The resulting terms are any interior geohash that is a prefix of "bqz":

Interior-geohash(bqz)
Interior-geohash(bq)
Interior-geohash(b)

Additional negative search terms arise from the exterior geohashes of Q. Consider the exterior geohash "bqy." Based on "~IE", the set of negative search terms should include any interior geohashes that intersect "bqy". In other words, exclude any geohash that is a prefix of "bqy" or has "bqy" as a prefix. Also, if a boundary geohash box is contained in box "bqy" (has "bqy" as a prefix), that results in negative search terms too (the boundary geohash box contains some interior points as well as boundary points). This yields the following negative search terms:

Interior-geohash(bqy)
Interior-geohash(bq)
Interior-geohash(b)
Interior-geohash-prefix(bqy)
Boundary-geohash-prefix(bqy)

Similar negative search terms for "~IE" arise from all of the exterior geohashes of Q, not just "bqy". In this case, the restriction "~BE" does not add any additional negative search terms. The geohash index can only be certain that the boundary of R intersects the exterior of Q ("BE") if R has a boundary geohash that is contained in an exterior geohash of Q. For the exterior geohash "bqy", this would add the negative search term:

Boundary-geohash-prefix(bqy)

However, this term is already contained in the list of excluded terms. The resulting list of positive search terms minus negative search terms is submitted to the universal index as an "and-not" query. While the construction of the terms is logically a two-step process, in fact the query resolves against the universal index in a single step. In order to obtain fully accurate results, the secondary index 126 must be searched when any boundary/boundary search term is present. The use of boundary geohashes in addition to interior/exterior geohashes will result in fewer false positives from the primary index (that is, more hits and misses and fewer unresolved cases).

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method implemented by a computer with a processor and a memory storing instructions executed by the processor, comprising:
receiving a query with a search region and a predicate, wherein the search region is characterized by ellipsoidal geographic coordinates;
mapping the search region to a set of blocks;
for each block in the set of blocks,
transforming the ellipsoidal geographic coordinates of the search region to flat coordinates,
retrieving results from a primary index when the block does not contain a boundary of the search region, wherein the primary index stores non-boundary entries with associated flat coordinates, wherein retrieving results from the primary index includes retrieving results based upon qeohash prefix substrings derived from a qeohash prefix string, retrieving results from a secondary index when the block does contain a boundary of the search region, wherein the retrieving results from the secondary index includes processing the boundary and the predicate against the secondary index to obtain a list of interactions between the boundary and regions within the secondary index, wherein the interactions are characterized as hit, miss or unresolved, and wherein the secondary index stores boundary entries with associated flat coordinates.

2. The method of claim 1 wherein the predicate is a space relation between the boundary and regions within the secondary index.

3. The method of claim 1 wherein the predicate is selected from equals, disjoint, touches, contains, intersects, inside and covered by.

4. The method of claim 1 wherein processing the boundary and the predicate against the secondary index includes utilizing the Dimensionally Extended Nine-Intersection Model (DE-9IM) to characterize special relations between the boundary and regions within the secondary index.

* * * * *